US010742517B2

(12) United States Patent
O'Connell et al.

(10) Patent No.: US 10,742,517 B2
(45) Date of Patent: Aug. 11, 2020

(54) RAPID TESTING OF CONFIGURATION CHANGES IN SOFTWARE DEFINED INFRASTRUCTURE

(71) Applicant: International Business Machines Corporation, Armonk, NY (US)

(72) Inventors: Brian O'Connell, Wake, NC (US); Shyam Manohar, Karnataka (IN); Richard A. Locke, Cary, NC (US); Aaron K. Baughman, Silver Spring, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 16/024,247

(22) Filed: Jun. 29, 2018

(65) Prior Publication Data

US 2020/0007406 A1    Jan. 2, 2020

(51) Int. Cl.
*H04L 12/26* (2006.01)
*H04L 12/24* (2006.01)
*G06F 9/455* (2018.01)

(52) U.S. Cl.
CPC ........ *H04L 41/145* (2013.01); *G06F 9/45558* (2013.01); *H04L 41/147* (2013.01); *H04L 43/50* (2013.01)

(58) Field of Classification Search
None
See application file for complete search history.

(56) References Cited

U.S. PATENT DOCUMENTS

| 8,819,701 | B2 | 8/2014 | Wheeler et al. |
| 9,727,365 | B2 | 8/2017 | Chastain et al. |
| 9,792,187 | B2 | 10/2017 | Mutalik et al. |
| 2004/0083129 | A1* | 4/2004 | Herz ............... G06Q 20/201 726/25 |
| 2016/0019098 | A1 | 1/2016 | Cahill et al. |
| 2017/0329698 | A1 | 11/2017 | Watt et al. |
| 2018/0026849 | A1* | 1/2018 | Guim Bernat ...... G06F 16/2379 709/223 |

OTHER PUBLICATIONS

Liu, "Rapid application configuration in Amazon cloud using configurable virtual appliances," SAC '11 Proceedings of the 2011 ACM Symposium on Applied Computing, pp. 147-154.
(Continued)

*Primary Examiner* — Cai Y Chen
(74) *Attorney, Agent, or Firm* — Garg Law Firm, PLLC; Rakesh Garg; William Hartwell

(57) ABSTRACT

A future event that is likely to occur in a production SDI at a future time is forecasted by analyzing operational data from the production SDI. Using a repository of correlation records, a set of configurations is forecasted likely to change in response to the future event. Corresponding to a configuration from the forecasted set of configurations, an instruction is constructed for a testing SDI. The testing SDI is caused by the instruction to initialize a test VM in the testing SDI, where the test VM is specifically configured to test a change in the configuration from the forecasted set of configurations, and where the test VM is ready to test the change when the future event occurs at the future time.

20 Claims, 6 Drawing Sheets

(56) References Cited

OTHER PUBLICATIONS

Carrozza et al., "On the Evaluation of VM Provisioning Time in Cloud Platforms for Mission-Critical Infrastructures," 2014 14th IEEE/ACM International Symposium on Cluster, Cloud and Grid Computing, Year: 2014, pp. 802-810.

Wu et al., "Automation of Cloud Node Installation for Testing and Scalable Provisioning," UCC '17 Companion Proceedings of the 10th International Conference on Utility and Cloud Computing, pp. 79-84.

* cited by examiner

RAPID TESTING OF CONFIGURATION CHANGES IN SOFTWARE DEFINED INFRASTRUCTURE

TECHNICAL FIELD

The present invention relates generally to a method, system, and computer program product for reliably and efficiently managing changes in a software defined infrastructure (SDI). More particularly, the present invention relates to a method, system, and computer program product for rapid testing of configuration changes in SDIs.

BACKGROUND

A data processing environment comprises a variety of hardware, software, and firmware components. A physical network, also called a data plane or an underlay, is a network of physical components where actual networking operations are performed and computational workloads are executed.

Techniques are available presently to construct a logical network, also known as a software defined network (SDN) overlay (hereinafter interchangeably, "SDN" or "overlay"), from the components of an underlay. Essentially, networking components and data processing components are abstracted into corresponding logical or virtual representations, and the abstractions are used to define the SDN. In other words, an SDN is a logical network formed and operated using logical representations of the underlying physical components.

Once the virtualization of compute and storage elements is achieved by SDNs, larger and more complex infrastructures can be built using the underlying virtualized elements. Such infrastructure built in code using elements of SDN combined with large-scale compute and storage functions, such as cloud computing infrastructure, is referred to as a Software Defined Infrastructure (SDI).

In SDI, a workload's configuration is described in terms of functional and non-functional requirements in code. The code description of the workload or workload's configuration resolves into physical and/or virtual resources from whatever type of underlying network might be in use. For example, a configuration change in code in an SDI may cause a virtual server to be configured in the underlying SDN. The provisioning of the underlying resources is abstracted to code in the SDI in this manner.

Software Defined Environment (SDE) refers to operational automation using the SDI or SDN elements as code components. Automated installation and configuration of software and compute or storage resources is a fundamental feature of SDE. As it exists today, SDE features further include cross-domain integration, orchestration and coordination. Cross-domain integration means that deployments are more than just instantiations of Virtual machines (VM, plural VMs). Owing to the SDI underlying the SDE, deployment of a workload in an SDE is encoded as the collection of VMs that makes up the workload. This deployment can include domains like load balancers, application servers as well as database nodes and many other elements all forming a single workload deployment unit. Deploying collections of servers also requires some level of orchestration in order to configure and deploy not just a single VM instance, but many. Also, some of the information needed to complete the orchestration are not known until the workload is being deployed. IP addresses, user credentials as well as other security information such as certificates are generally installed as part of the deployment process. In an SDE, all of these activities are orchestrated, in many instances across VMs.

The various components in an SDI are configured using code. A 'configuration' as used herein refers to code that represents a component in an SDI. Accordingly, the various components in the SDI are managed, modified, and manipulated by performing configuration changes, i.e., code changes.

This code manifestation of SDI components allows automated configuration management systems to manage and operate various components in a given SDI. A configuration management system (CMS) uses a CMS-specific programming language which mimics a conventional higher-level programming language, such as an object oriented programming language or an interpreted programming language. Using such a language, a CMS allows automated methods to create, manage, or modify software-defined components in an SDI. When a change is to be made to a component in the SDI, the CMS facilitates the manipulation of a configuration and deploys a new or modified configuration in the SDI to effectuate the change in the SDI.

A monitoring system (MS) is a tool that monitors or observes the operations and performance of a collection of systems in a data processing environment. An MS can be used with a physical data processing environment or an SDI. When operating with an SDI, the MS observes the operations of the various SDI components, collects performance metrics, detects alarms and events, provides notifications to administration personnel.

SUMMARY

The illustrative embodiments provide a method, system, and computer program product. An embodiment includes a method that forecasts, by analyzing operational data from a production SDI, a future event that is likely to occur in the production SDI at a future time. The embodiment forecasts, using a repository of correlation records, a set of configurations that are likely to change in response to the future event. The embodiment constructs, corresponding to a configuration from the forecasted set of configurations, an instruction for a testing SDI. The embodiment causes, responsive to the instruction, the testing SDI to initialize a test virtual machine (VM) in the testing SDI, wherein the test VM is specifically configured to test a change in the configuration from the forecasted set of configurations, and wherein the test VM is ready to test the change when the future event occurs at the future time.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
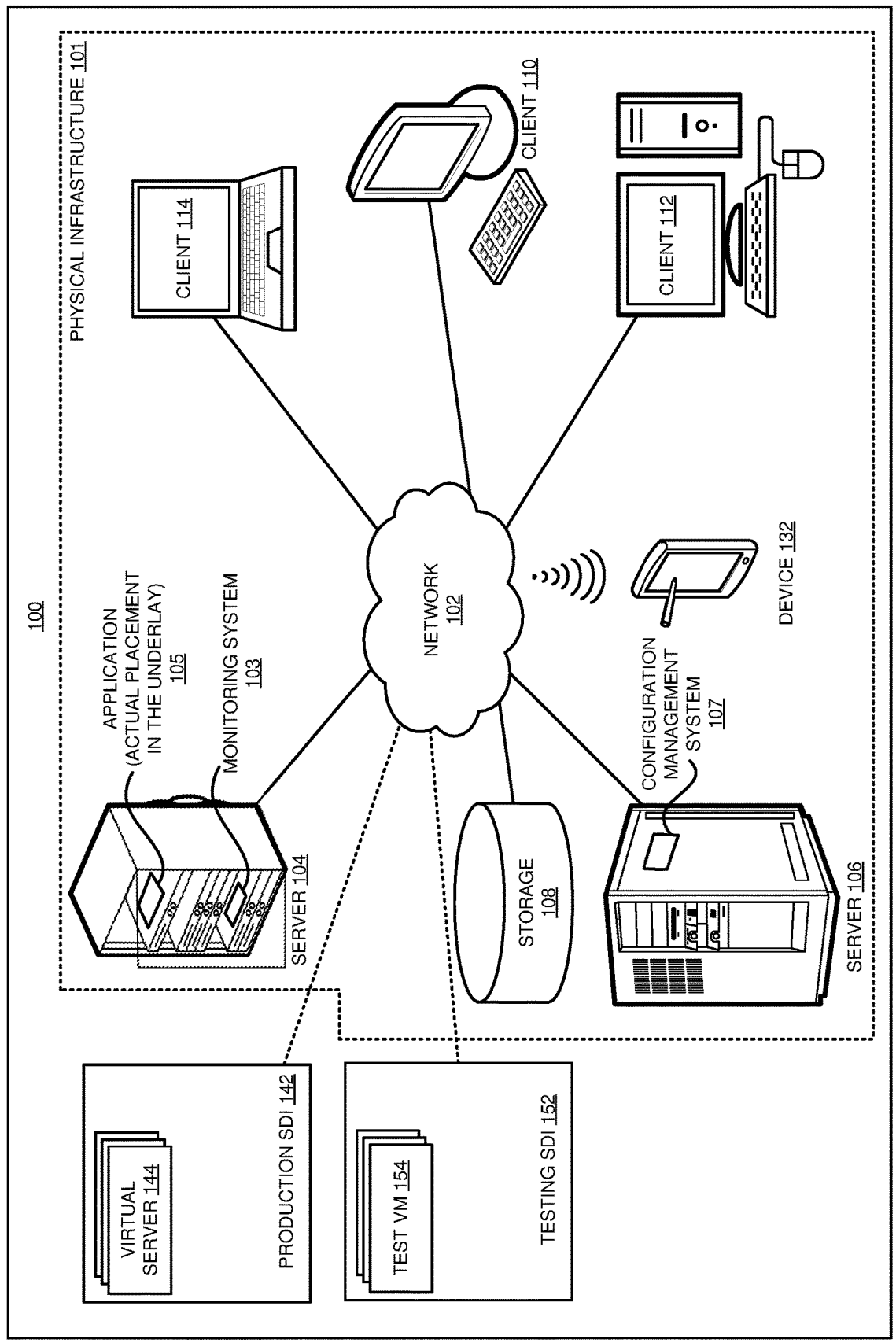
FIG. 1 depicts a block diagram of a network of data processing systems in which illustrative embodiments may be implemented.

SDI and CMS are well recognized technological fields of endeavor. The present state of the technology in these fields of endeavor has certain drawbacks and limitations. The operations and/or configurations of the illustrative embodiments impart additional or new capabilities to improve the existing technology in these technological fields of endeavor, especially in the area of expediting testing of configuration changes by forecasting a likely configuration change and preconfiguring suitable test virtual machines to be ready and available for testing the configuration change when the configuration change does occur.

An SDI may include components, such as servers, which are handling live actual transactions, users, and data. Such an SDI is referred to herein as a production SDI, and a component in a production SDI is referred to a production component, such as a production server.

Similarly, an SDI may include components, such as servers, which are setup to test component configurations before the component configurations are deployed to the production SDI. Such an SDI is referred to herein as a testing SDI (or test SDI), and a component in a testing SDI is referred to a test component, such as a test VM. The testing of a configuration that is new or changed often test data, historical actual data, or some combination thereof.

A variety of events can occur in a production SDI. An event is an occurrence that exceeds a corresponding limit, approaches a particular state, is a reason for some notification, addressable by a configuration change, or some combination thereof. Some non-limiting examples of events that can occur in an SDI include storage capacity approaching a critical limit, memory utilization being outside of a normal utilization range, processing latency exceeding a threshold, number or rate of threads spawning being too high, a particular error condition, a stalled state of a process, and many others.

The illustrative embodiments recognize that presently, events occurring in a production SDI are presently resolved as the events occur. The resolution typically involves a technical team member receiving a notification of the event from an MS, the team member modifying a configuration, the team member testing the modified configuration using a testing SDI, and upon satisfactory testing, causing a CMS to deploy the modified configuration to the production SDI.

The illustrative embodiments recognize that presently, to test a configuration change in a testing SDI, a test VM has to be configured that its suitable for testing the particular configuration change. For example, suppose that a configuration change seeks to resolve an event that occurred in (or has the characteristics of) a particular operating system using a particular processor type and memory type, with a certain processor speed and memory amount. To test the configuration change properly, a test VM should be configured in the testing SDI such that the test VM is operating with a similar operating system using a similar processor type and memory type, with a similar processor speed and memory amount.

The illustrative embodiments recognize that it is cost prohibitive and impractical to keep a large variety of test VMs instantiated and ready for testing configuration changes that are responsive to any of a large variety of events. Therefore, presently, a test VM is configured once the event has occurred, an appropriate configuration has been identified for changing, and a configuration change is ready for testing.

The illustrative embodiments recognize that the configuring and starting of test VMs (spin-up of test VMs) consumes significant amount of time, on the order of 10-15 minutes of spin-up time, before a test VM is fully available for testing the configuration changes. However, in many cases, events in production environments cannot be left unresolved for any significant length of time, and the spin-up time can introduce unacceptable delays in event resolution.

The present state of the technological field of endeavor of configuration change management in SDIs does not include a mechanism, other than detecting an event and then post-facto making the configuration changes and spinning up test VMs, to avoid unacceptable delays in configuration change deployment. A need exists for predicting which configuration changes are likely to be upcoming. A need exists that appropriate test VMs be already spun-up and ready for testing when such predicted changes are in fact realized.

The illustrative embodiments recognize that the presently available tools or solutions do not address these needs/problems or provide adequate solutions for these needs/problems. The illustrative embodiments used to describe the invention generally address and solve the above-described problems and other related problems by rapid testing of configuration changes in SDIs.

An embodiment can be implemented as a combination of certain hardware components and a software application. An implementation of an embodiment, or one or more components thereof, can be configured as a modification of an existing CMS or MS, with a companion software application executing in some combination of (i) the CMS or MS itself, (ii) a data processing system communicating with the CMS or MS over short-range radio or a local area network (LAN), and (iii) a data processing system communicating with the CMS or MS over a wide area network (WAN).

The illustrative embodiments operate in two modes—one mode building event-configuration change correlations, and the other mode forecasting configuration changes and triggering test VM initialization. An MS is configured to monitor the operations of production components in a production SDI. In the correlations mode, an embodiment receives an alert, i.e., a notification, from the MS about an event that has occurred in a production component, e.g., in a production server.

A CMS is configured to manage the configurations deployed in the production SDI. The CMS deploys a configuration change to the production SDI in response to the event. The embodiment operating in the correlations mode identifies the configuration changes that the CMS deploys in response to the event.

An event has a set of characteristics. An embodiment classifies the event according to one or more of such characteristics. For example, an event may be processing latency exceeding a threshold. Such an example event has characteristics, which include server machine type, processor type, processor speed, memory size, memory speed, process type, process priority, user of the process, time at which the latency occurs, and numerous other circumstantial characteristics pertaining to the latency experienced at a particular SDI component, in a particular SDI, at a particular time, under a particular set of circumstances.

From this disclosure, those of ordinary skill in the art will be able to conceive many other events and their corresponding sets of characteristics and the same are contemplated within the scope of the illustrative embodiments. Based on one, some, or all of the characteristics associated with an event, the embodiment classifies or categorizes the event into a class or category.

Using this manner of classifying events, an embodiment operating in the correlations mode classifies the event for which the MS had provided the alert. In one implementation, a class of an event may simply be a subset of characteristics of the event. In another implementation, a class of an event is derived from a subset of the event's characteristics.

The embodiment forms a correlation between the class of the alerted event and the configurations that have changed and deployed as a result of the event. The embodiment creates and saves the data of one or more event-configuration correlations in a correlations repository. For example, if the event causes ten configurations to change, one embodiment constructs one correlation record per event classification, and correlates all ten configurations with the event classification. Another embodiment constructs one correlation record for configuration changed for the event classification, and correlates each of the ten configurations separately with the event classification using separate correlation records for each configuration.

In some implementations, the MS may be configured to capture event resolution status from the production SDI. When the MS is so configured, an embodiment receives or extracts the event resolution status for the alerted event after the configuration changes have been deployed. The embodiment adds or modifies a correlation record with the event resolution status.

The event resolution status can take any suitable form, including but not limited to Boolean 'resolved/not resolved', on a scale—e.g. resolved 4 out of 5, or some other suitable representation. An embodiment can also convert one representation of the event resolution status to a different representation before associating the status with a correlation record.

One embodiment, in the correlations mode, collects additional data from the MS. For example, when the MS alerts the embodiment about an event, the embodiment collects additional data about other events or activities that could potentially be related to the event according to some heuristic. For example, when the event indicates a critical depletion of disk storage, such additional data might include information about processes that have been actively writing to the disk over a past period. As another example, when the event indicates an above threshold network congestion at a production server, such additional data might include information about processes that have been actively transmitting over a past period. As another example, when the event indicates excessive thread spawning at a production server, such additional data might include information about the types of transactions, number of users, the applications involved in user-sessions, and the like, at the time of the event or over a past period.

These examples of additional data are not intended to be limiting. From this disclosure, those of ordinary skill in the art will be able to conceive many other event-related additional data and the same are contemplated within the scope of the illustrative embodiments. An embodiment associates the additional data with the correlation record of the event classification.

In the forecasting mode, an embodiment forecasts an event that is likely to occur relative to a production component in a production SDI. For example, to forecast an event, one embodiment collects from the MS, either routinely or in an ongoing manner, the operational data about the production SDI and components therein. Using the operational data, the embodiment determines whether any operation data corresponds or matches any additional data in a correlation record, such that the operational data could be indicative of an impending event of the same classification as in the correlation record. When the operational data matches the additional data of a correlation record to a threshold degree, the embodiment concludes that an event of the event class of the correlation record is impending.

This example method of event forecasting is not intended to be limiting. From this disclosure, those of ordinary skill in the art will be able to conceive many other ways of forecasting events in SDIs and the same are contemplated within the scope of the illustrative embodiments.

Once an embodiment predicts or forecasts the likelihood of an event (with greater than a threshold degree of likelihood), the embodiment forecasts a set of configurations that are likely to be changed if and when the event does occur. To forecast the configurations, the embodiment refers to the set of one or more correlation records associated with the class of the forecasted event. The configurations identified from those correlation records are output from an embodiment as the forecasted set of configurations that are likely to be changed.

If an event resolution status is also available in the correlation record as described herein, one embodiment computes the likelihood of the configuration using the event resolution status. For example, if a configuration is forecasted as likely to change in view of a forecasted event, if a previous configuration change using that particular configuration indicated a successful event resolution status, the likelihood that the configuration will be changed, should the forecasted event occur, increases (and vice-versa).

One embodiment outputs the forecasted configurations to a CMS that is managing a testing SDI. Using a forecasted configuration, the testing CMS selects an appropriate configuration for a test VM that will likely be needed to test the forecasted configuration. The testing CMS initializes and makes ready the test VM ahead of the event actually occurring. Thus, when the event occurs, the test VM for the configuration that will be changed in response to the event will already be ready to test the configuration change. An embodiment can transmit to the testing CMS any number of forecasted configurations to cause a corresponding number of test VMs to be initialized in this manner.

Another embodiment computes a test VM specification based on the forecasted configuration. The embodiment triggers the testing CMS to initialize a test VM according to the computed specification. The testing CMS initializes and makes ready the test VM according to the specification ahead of the event actually occurring. In this manner of operation as well, when the event occurs, the test VM for the configuration that will be changed in response to the event will already be ready to test the configuration change. An embodiment can trigger any number of test VMs to be initialized in this manner.

The manner of rapid testing of configuration changes in SDIs described herein is unavailable in the presently available methods in the technological field of endeavor pertaining to configuration management in SDIs. A method of an embodiment described herein, when implemented to execute on a device or data processing system, comprises substantial advancement of the functionality of that device or data processing system in predictively initializing test machines to test forecasted configuration changes ahead of an event occurring in a production SDI.

The illustrative embodiments are described with respect to certain types of networks, components, monitoring systems, configuration management systems, configurations, events, alerts, additional data, operational data, correlation records, modes, configuration changes, test VMs, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
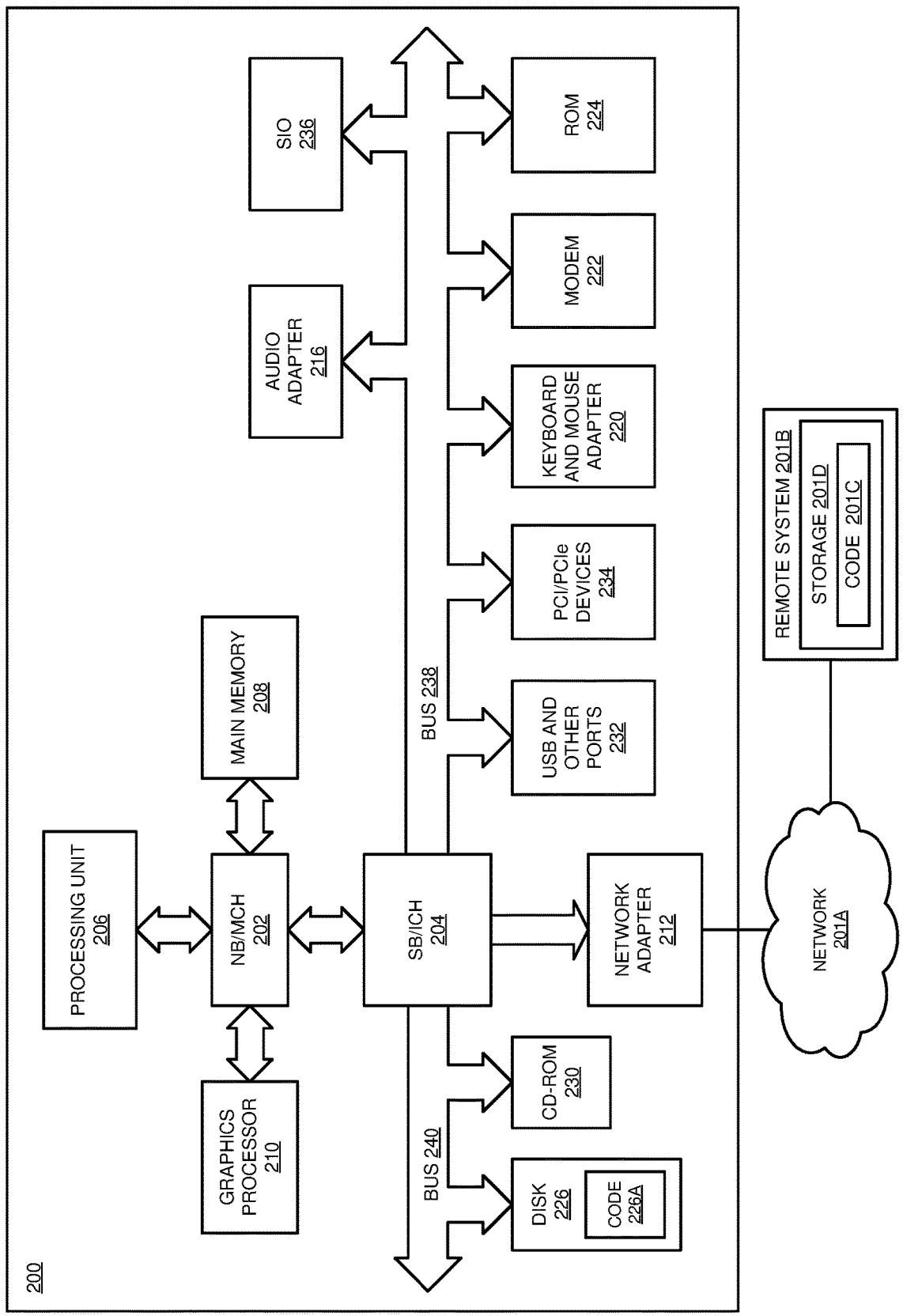
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 and the resources connected thereto forms physical network 101 over which production SDI 142 and testing SDI 152 are structured. Physical network 101 includes MS 103, and physical data processing components, such as servers 104 and 106 or components therein. One or more virtual server 144 are examples of software-defined data processing components in production SDI 142. Application 105 causes the instantiation of one or more test VM 154 in testing SDI 152 in a manner described herein. Configuration management system 107 is an example CMS implementing the functions described herein. In one embodiment, a single instance of CMS 107 manages production SDI 142 as well as testing SDI 152. In another embodiment, different instances (not shown) of CMS 107 manage production SDI 142 and testing SDI 152 separately.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
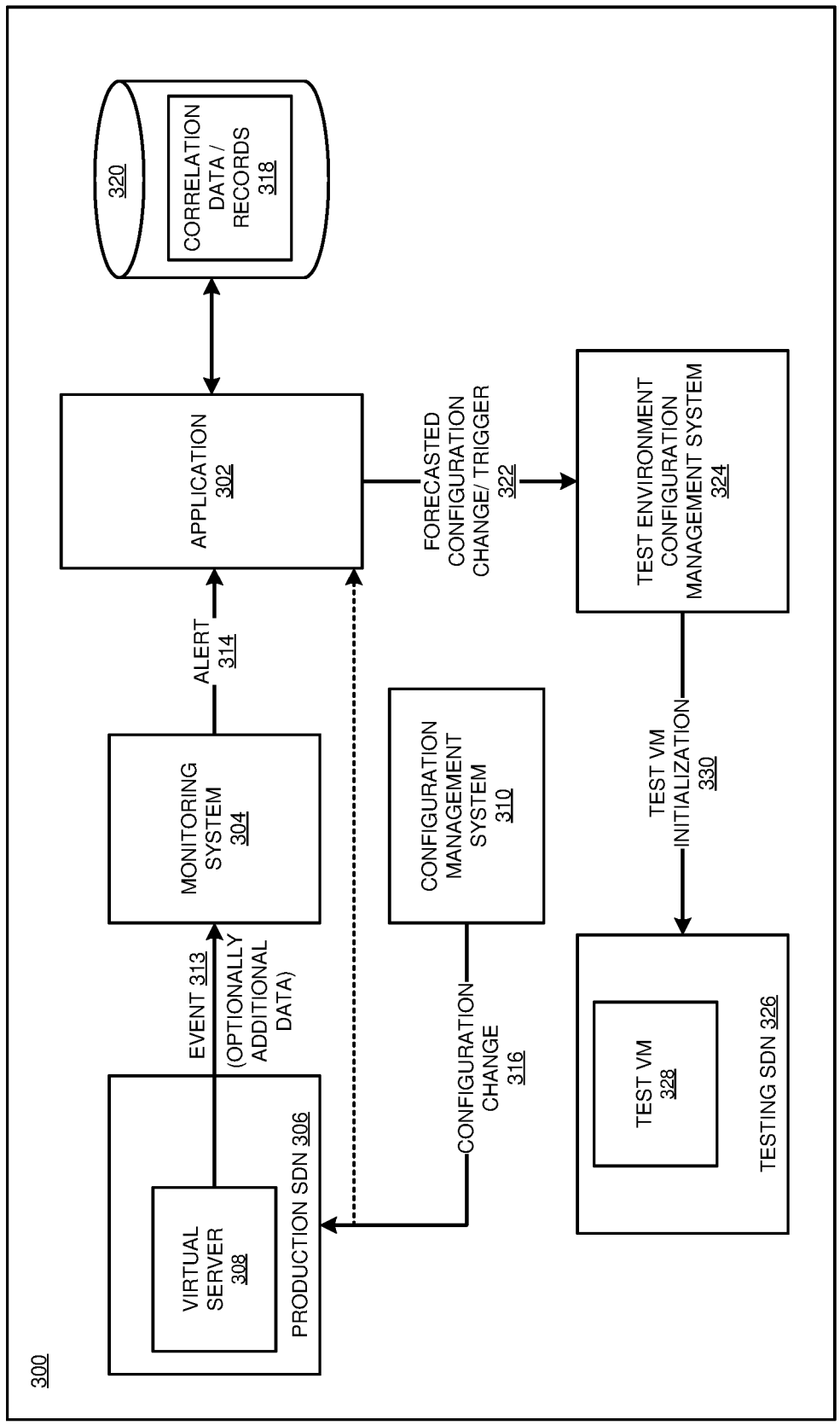
FIG. 3 depicts a block diagram of an example setup for rapid testing of configuration changes in SDIs in accordance with an illustrative embodiment.

With reference to FIG. 3, this figure depicts a block diagram of an example setup for rapid testing of configuration changes in SDIs in accordance with an illustrative embodiment. Application 302 is an example of application 105 in FIG. 1. MS 304 is an example of MS 103 in FIG. 1. Production SDI 306 is an example of production SDI 142 in FIG. 1. Virtual server 308 is an example of virtual server 144 in FIG. 1. CMS 310 is one Instance of CMS 107 in FIG. 1, and manages the configurations in production SDI 306.

MS 304 detects event 312 in virtual server 308. MS 304 optionally also collects additional data related to event 312, as described herein. MS 304 sends alert 314 to application 302. Alert 314 includes information about event 312 as well as the additional data when available.

When a technical team member has prepared configuration change 316, CMS 310 deploys configuration change 316 to production SDI 306. Configuration change 316 is responsive to and resolves event 312. Optionally (not shown), MS 304 may collect event resolution status from production SDI 306 and forward to application 302 in a manner described herein.

In the correlations mode, application 302 detects configuration change 316 that are being deployed to production SDI. Application constructs one or more correlation records using alert 314 and configuration change(s) 316. Application 302 stores correlation records 318 in correlations repository 320.

In the forecasting mode, application 302 forecasts an event that is of a class and is likely to occur in production SDI 306. Based on the forecasted event, application produces a set of forecasted configuration changes. Application 302 produces output 322 to CMS 324. CMS 324 is another instance of CMS 107 and is responsible for configuring and managing testing SDI 326. Output 322 may be a forecasted configuration that is likely to change, or a specification of test VM 328 which triggers initialization 330 of test VM 328.

Figure 4:
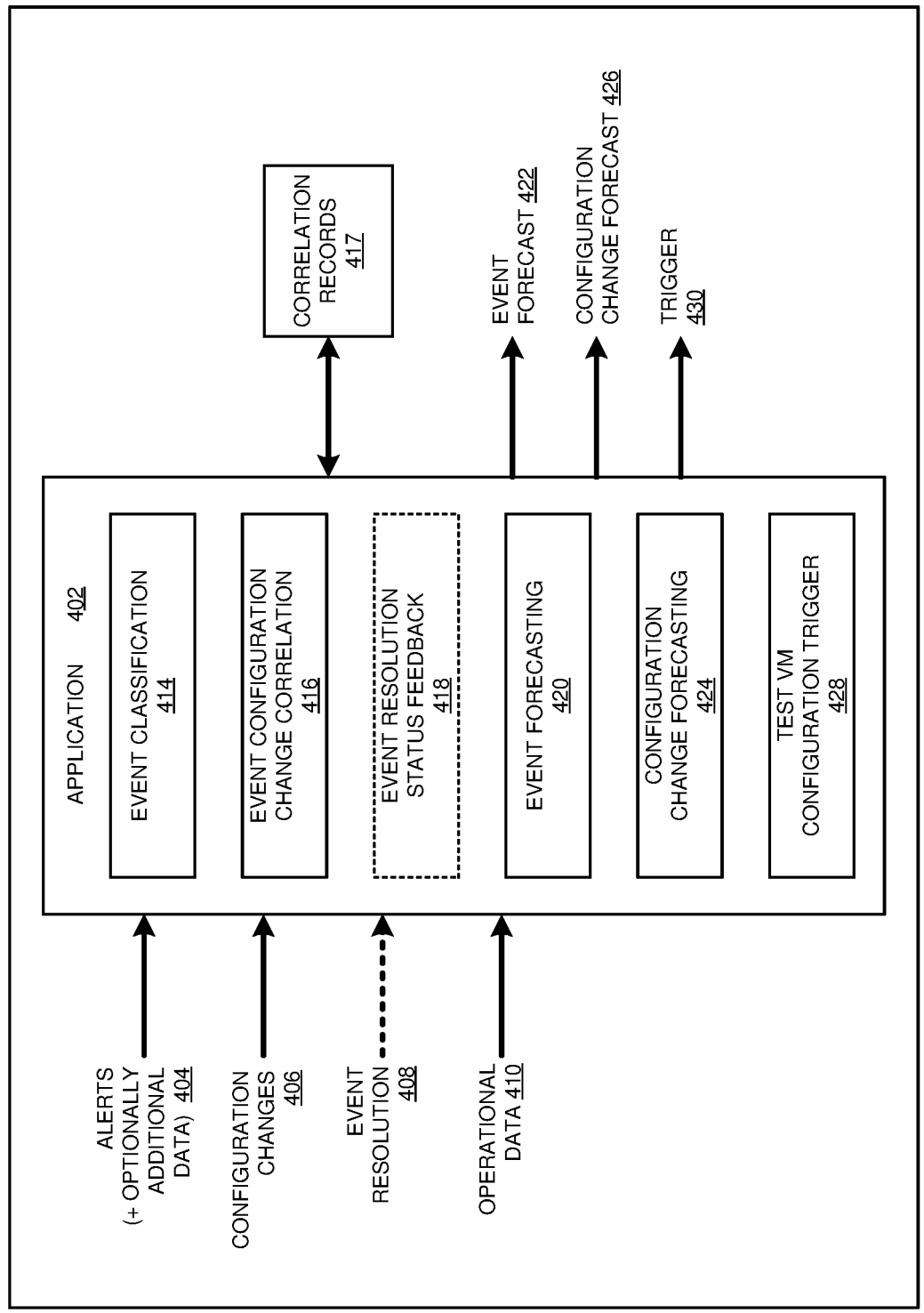
FIG. 4 depicts a block diagram of an example application for rapid testing of configuration changes in SDIs in accordance with an illustrative embodiment.

With reference to FIG. 4, this figure depicts a block diagram of an example application for rapid testing of configuration changes in SDIs in accordance with an illustrative embodiment. Application 402 can be used as application 302 in FIG. 3.

Input 404 includes an alert for an event in a production SDI, and optionally additional event-related data, as described herein. Input 406 includes one or more configuration changes deployed to the production SDI as described herein. Optional input 408 includes an event resolution status after a configuration change is deployed to resolve an event reported in input 404. Input 410 includes operational data from one or more production components in the production SDI, usable in a forecasting mode of application 402, as described herein.

In correlations mode, component 414 classifies the event from input 404. Component 416 correlates the event with the configuration change of input 406. Application 402 outputs the event-configuration change correlation record 417 to a repository. Component 418 optionally uses input 408 as event resolution feedback to calculate an event resolution status and associate the status with a correlation record.

In forecasting mode, component 420 uses input 410 to forecast an event of a particular class. The forecasted event can be optionally output from application 402 as output 422.

Component 424 forecasts a configuration that is likely to change. The forecasted configuration can be output to a test CMS as output 426. In some cases, a suitably configured component 428 can compute the specifications of a test VM to test a forecasted configuration change. When such a specification can be determined, component outputs trigger 430 to the test CMS for initializing a test VM according to the computed specifications.

Figure 5:
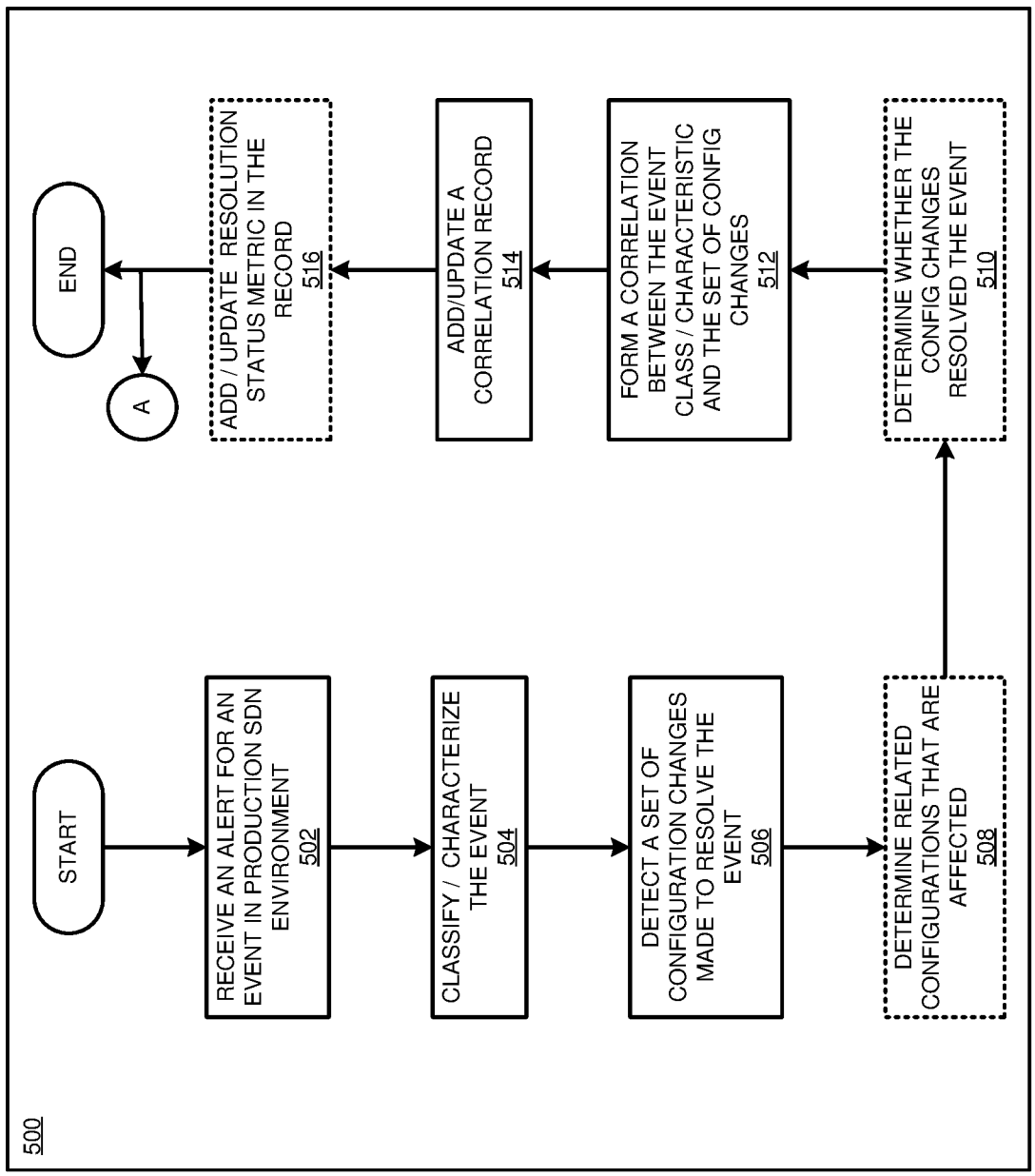
FIG. 5 depicts a flowchart of an example process for forming event-configuration change correlations in accordance with an illustrative embodiment.

With reference to FIG. 5, this figure depicts a flowchart of an example process for forming event-configuration change correlations in accordance with an illustrative embodiment. Process 500 can be implemented in application 402 in FIG. 4.

The application receives an alert from a MS for an event that has occurred in a production SDI (block 502). The application classifies the event (block 504). The application detects a set of configuration changes that are made and deployed by a CMS to the production SDI (block 506).

Optionally, the application may also identify a related configuration that should be modified and deployed to resolve the event (block 508). In most cases, all related configurations are already identified, modified, and deployed at block 506 and block 508 may not be necessary.

Optionally, an event resolution status may be available from the MS. When available, the application uses the event resolution status to compute whether and how successful were the configuration changes in resolving the event (block 510).

The application forms a correlation between a configuration that was changed and the event class (block 512). The application forms one or more correlations in this manner.

The application adds the correlation record or updates an existing correlation record with the correlation formed at block 512 (block 514). The application optionally adds a computed event resolution status metric to the correlation record when the status feedback is available (block 516). The application either ends process 500 thereafter or exits process 500 via exit marked "A" to enter process 600 of FIG. 6 via entry marked "A".

Figure 6:
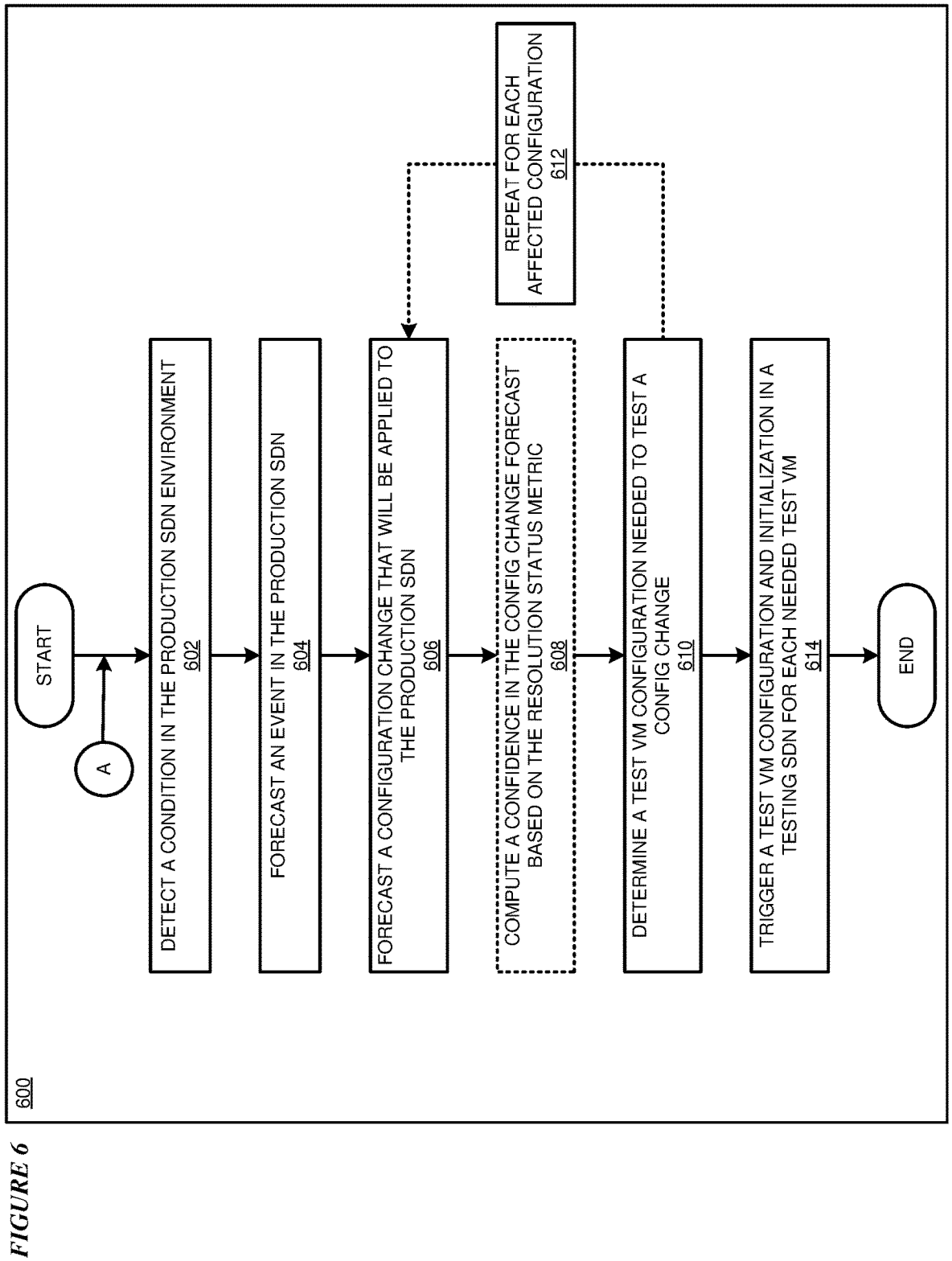
FIG. 6 depicts a flowchart of an example process for pre-configuring a test VM for testing a forecasted configuration change in accordance with an illustrative embodiment.

With reference to FIG. 6, this figure depicts a flowchart of an example process for pre-configuring a test VM for testing a forecasted configuration change in accordance with an illustrative embodiment. Process 600 can be implemented in application 402 in FIG. 4.

The application detects a condition in the production SDI, e.g., by analyzing operational data from the SDI (block 602). The application forecasts an event of a class that is likely to occur in the production SDI at a future time (block 604). The application forecasts a configuration change that will likely be applied to the production SDI to resolve the forecasted event (block 606). Optionally, the application also computes a confidence level in the forecasted configuration change based on the event resolution status information when available in a correlation record (block 608).

The application determines a configuration or specification of a test VM that will be needed to test the configuration change (block 610). When more than one configuration is likely to change, the application repeats blocks 606, 608, ad 610 for each forecasted configuration (block 612). The application either outputs the forecasted configurations that are likely to change, or the specification of one or more test VMs as triggers to a CMS that manages a testing SDI (block 614). The application ends process 600 thereafter.

Thus, a computer implemented method, system or apparatus, and computer program product are provided in the illustrative embodiments for rapid testing of configuration changes in SDIs and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
forecasting, by analyzing operational data from a production software defined infrastructure (SDI), a future event that is likely to occur in the production SDI at a future time;
forecasting, using a repository of correlation records, a set of configurations that are likely to change in response to the future event;
constructing, corresponding to a configuration from the forecasted set of configurations, an instruction for a testing SDI; and
causing, responsive to the instruction, the testing SDI to initialize a test virtual machine (VM) in the testing SDI, wherein the test VM is specifically configured to test a change in the configuration from the forecasted set of configurations, and wherein the test VM is ready to test the change when the future event occurs at the future time.

2. The method of claim 1, further comprising:
computing a specification of the test VM;
including the specification of the test VM in the instruction; and
sending the instruction to a test configuration management system (CMS) that is managing the testing SDI, wherein the test CMS initializes the test VM in the testing SDI according to the specification.

3. The method of claim 1, further comprising:
identifying, as a part of the instruction, the configuration from the forecasted set of configurations to a test CMS;
causing, responsive to the identifying, a specification of the test VM to be computed at the test CMS, wherein the test CMS initializes the test VM in the testing SDI according to the specification.

4. The method of claim 1, further comprising:
receiving, from the production SDI, an alert, the alert comprising information about a current event occurring at a current time in the production SDI;
detecting a deployment by a production CMS to the production SDI, of a first change in a first configuration;
correlating, to form a correlation record, a class of the current event and the first configuration; and
saving the correlation record in the repository of correlation records, wherein the future event is of the class, and the forecasted set of configurations includes the first configuration.

5. The method of claim 4, further comprising:
receiving an event resolution status from a monitoring system, wherein the monitoring system monitors the production SDI, and wherein the event resolution status is indicative of whether the first change to the first configuration resolved the current event;
adding to the correlation record, a value corresponding to the event resolution status; and
using the value to compute a confidence value for including the first configuration in the forecasted set of configurations.

6. The method of claim 1, wherein the future event comprises a set of characteristics, a subset of the characteristics being usable to determine a class of the future event.

7. The method of claim 1, wherein a configuration in the set of configurations comprises code representation of a data processing system, the code representation forming a virtual data processing system in the production SDI.

8. A computer usable program product comprising a computer-readable storage device, and program instructions stored on the storage device, the stored program instructions comprising:

program instructions to forecast, by analyzing operational data from a production software defined infrastructure (SDI), a future event that is likely to occur in the production SDI at a future time;

program instructions to forecast, using a repository of correlation records, a set of configurations that are likely to change in response to the future event;

program instructions to construct, corresponding to a configuration from the forecasted set of configurations, an instruction for a testing SDI; and program instructions to cause, responsive to the instruction, the testing SDI to initialize a test virtual machine (VM) in the testing SDI, wherein the test VM is specifically configured to test a change in the configuration from the forecasted set of configurations, and wherein the test VM is ready to test the change when the future event occurs at the future time.

9. The computer usable program product of claim 8, further comprising:

program instructions to compute a specification of the test VM;

program instructions to include the specification of the test VM in the instruction; and sending the instruction to a test configuration management system (CMS) that is managing the testing SDI, wherein the test CMS initializes the test VM in the testing SDI according to the specification.

10. The computer usable program product of claim 8, further comprising:

program instructions to identify, as a part of the instruction, the configuration from the forecasted set of configurations to a test CMS;

program instructions to cause, responsive to the identifying, a specification of the test VM to be computed at the test CMS, wherein the test CMS initializes the test VM in the testing SDI according to the specification.

11. The computer usable program product of claim 8, further comprising:

program instructions to receive, from the production SDI, an alert, the alert comprising information about a current event occurring at a current time in the production SDI;

program instructions to detect a deployment by a production CMS to the production SDI, of a first change in a first configuration;

program instructions to correlate, to form a correlation record, a class of the current event and the first configuration; and program instructions to save the correlation record in the repository of correlation records, wherein the future event is of the class, and the forecasted set of configurations includes the first configuration.

12. The computer usable program product of claim 11, further comprising:

program instructions to receive an event resolution status from a monitoring system, wherein the monitoring system monitors the production SDI, and wherein the event resolution status is indicative of whether the first change to the first configuration resolved the current event;

program instructions to add to the correlation record, a value corresponding to the event resolution status; and program instructions to use the value to compute a confidence value for including the first configuration in the forecasted set of configurations.

13. The computer usable program product of claim 8, wherein the future event comprises a set of characteristics, a subset of the characteristics being usable to determine a class of the future event.

14. The computer usable program product of claim 8, wherein a configuration in the set of configurations comprises code representation of a data processing system, the code representation forming a virtual data processing system in the production SDI.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising a processor, a computer-readable memory, and a computer-readable storage device, and program instructions stored on the storage device for execution by the processor via the memory, the stored program instructions comprising:

program instructions to forecast, by analyzing operational data from a production software defined infrastructure (SDI), a future event that is likely to occur in the production SDI at a future time;

program instructions to forecast, using a repository of correlation records, a set of configurations that are likely to change in response to the future event;

program instructions to construct, corresponding to a configuration from the forecasted set of configurations, an instruction for a testing SDI; and program instructions to cause, responsive to the instruction, the testing SDI to initialize a test virtual machine (VM) in the testing SDI, wherein the test VM is specifically configured to test a change in the configuration from the forecasted set of configurations, and wherein the test VM is ready to test the change when the future event occurs at the future time.

18. The computer system of claim 17, further comprising:
program instructions to compute a specification of the test VM;

program instructions to include the specification of the test VM in the instruction; and sending the instruction to a test configuration management system (CMS) that is managing the testing SDI, wherein the test CMS initializes the test VM in the testing SDI according to the specification.

19. The computer system of claim 17, further comprising:
program instructions to identify, as a part of the instruction, the configuration from the forecasted set of configurations to a test CMS;

program instructions to cause, responsive to the identifying, a specification of the test VM to be computed at the test CMS, wherein the test CMS initializes the test VM in the testing SDI according to the specification.

20. The computer system of claim 17, further comprising:
program instructions to receive, from the production SDI, an alert, the alert comprising information about a current event occurring at a current time in the production SDI;

program instructions to detect a deployment by a production CMS to the production SDI, of a first change in a first configuration;
program instructions to correlate, to form a correlation record, a class of the current event and the first configuration; and
program instructions to save the correlation record in the repository of correlation records, wherein the future event is of the class, and the forecasted set of configurations includes the first configuration.

\* \* \* \* \*